United States Patent [19]

Oosterkamp

[11] Patent Number: 4,947,485
[45] Date of Patent: Aug. 7, 1990

[54] METHOD FOR OBTAINING LOAD-FOLLOWING CAPABILITY IN NATURAL CIRCULATION, FREE-SURFACE SEPARATION BOILING WATER REACTORS

[75] Inventor: Willem J. Oosterkamp, Los Gatos, Calif.

[73] Assignee: General Electric Company, San Jose, Calif.

[21] Appl. No.: 383,787

[22] Filed: Jul. 24, 1989

[51] Int. Cl.⁵ .......................... G21C 7/32; G21D 3/14
[52] U.S. Cl. .................................... 376/210; 376/241; 376/371; 376/377; 376/379
[58] Field of Search ........ 376/210, 241, 352, 370–373, 376/377, 379

[56] References Cited

U.S. PATENT DOCUMENTS

| 3,247,650 | 4/1966 | Kornbichler | 376/371 |
| 3,253,999 | 5/1966 | Weisman | 376/371 |
| 3,342,690 | 9/1967 | Stern | 376/371 |

FOREIGN PATENT DOCUMENTS 0100894  6/1984  Japan ................................... 376/371

*Primary Examiner*—Harvey E. Behrend
*Attorney, Agent, or Firm*—Robert R. Schroeder

[57] ABSTRACT

The present invention is directed to a natural-circulation boiling water reactor of the free-surface separation type wherein housed within the reactor pressure vessel (RPV) is a nuclear core which with the RPV defines an annulus region which is in flow communication with a core lower plenum region disposed beneath the nuclear core. A first upper steam dryer assembly is connected to a steam outlet in the RPV. A chimney is mounted atop the core and is in fluid communication with the first upper steam dryer assembly. The region outside of the chimney defines a downcomer region which also is in fluid communication with the chimney. Free-surface steam separation occurs within the chmney. Finally, a feedwater inlet is disposed within the RPV. The improvement for obtaining load-following capability in accordance with the present invention comprises a riser extension mounted atop the chimney and in fluid communication with the first upper steam dryer assembly. The riser extension has a plurality of orifices disposed about its outer periphery to provide fluid communication between the chmney and the downcomer region. A plurality of upstanding vanes are mounted atop the chimney and in adjacency with the riser extension orifices. The vanes define the outer periphery of the riser extension and direct fluid communication between the riser extension and the downcomer region. A second upper steam separator assembly is disposed within the RPV and is connected to a second steam outlet disposed within the RPV. The first steam outlet has a controllable, flow-restricting valve disposed therewithin. The downcomer region is in fluid communication with the second upper steam separator assembly. The foregoing arrangement permits a fraction of the steam passing through the riser extension to be guided by the vanes to pass to said downcomer region and impinge upon the RPV for separation of liquid water therefrom. The flow restricting valve controls the amount of steam that passes into the second steam separator assembly, and, thus, permits load-following capability for the BWR.

2 Claims, 1 Drawing Sheet

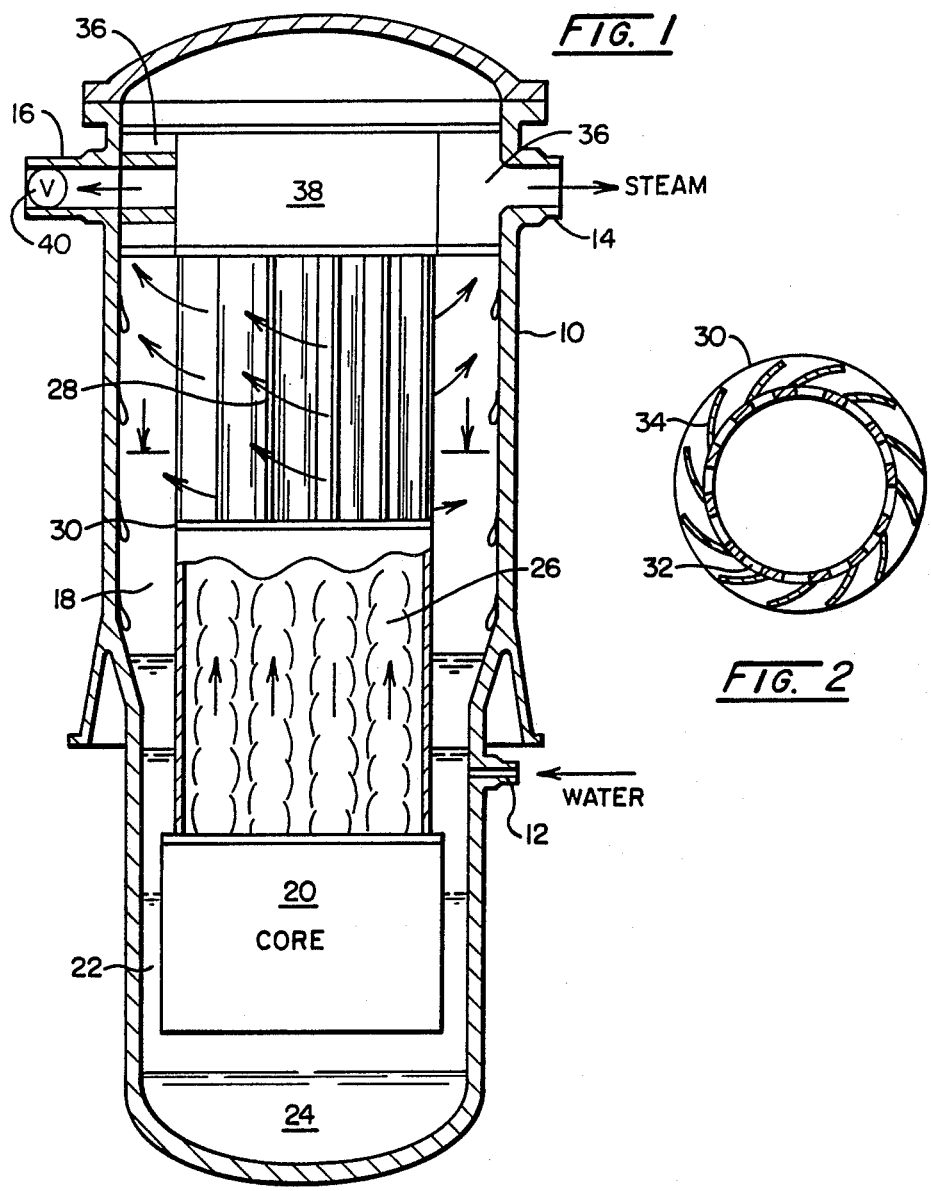

METHOD FOR OBTAINING LOAD-FOLLOWING CAPABILITY IN NATURAL CIRCULATION, FREE-SURFACE SEPARATION BOILING WATER REACTORS

BACKGROUND OF THE INVENTION

The present invention relates to nuclear boiling water reactors (BWRs) that utilize natural circulation and more particularly to enabling load-following capability in such reactor designs.

Existing large BWRs are of the forced-circulation type. In BWRs undergoing power generation operations, reactor coolant, initially in the form of sub-cooled liquid (e.g. water), is circulated by main coolant recirculation devices (e.g. jet pumps or mixed-flow motor-driven pumps) around a path a portion of which is comprised of the core lower plenum region (located at the bottommost section of the reactor), thence through the nuclear core and into a core upper plenum in communication with the core. Flow exiting the core upper plenum then passes through standpipes that lead to an assembly of steam separators. The reactor coolant exiting the nuclear core and passing into the core upper plenum is a two-phase mixture of steam and water, the proportion of which varies depending upon such factors as the power output from the fuel bundles, the amount of sub-cooling present in the coolant entering the fuel bundle, and the amount of flow through the bundles. This last factor depends on the power of the recirculation pumps and the hydrodynamic flow resistance presented by the fuel bundle geometry and wetted surfaces, and the amount of orificing representing restrictions to flow just prior to the coolant's entrance into the core fuel assembly.

Joining with the core effluent in the core upper plenum is the core "by-pass" flow, which is reactor coolant that has flowed from the core lower (entrance) plenum into the region external to the fuel assembly channels (but inside the core shroud), thence upwardly generally through the region occupied by cruciform-shaped control blades which stand in various degrees of insertion into the core, thence across the upper grid member (called the "top guide") which with its lattice-like configuration keeps the fuel assemblies in a regular array, and finally into the core upper plenum. This by-pass coolant stream at its discharge into the core upper plenum is comprised substantially of saturated liquid, with perhaps a small amount of steam. Within the core upper plenum, these two effluents—by-pass flow and fuel bundle exit flow—rapidly mix together and quickly lose identity from their origins.

Mechanical steam separation can be utilized to accomplish the separation of the steam from the steam/water mixture exiting the core. Some earlier BWR designs used free-surface steam separation where, just as in the household tea kettle, steam separates unaided from the free-surface, and saturated water remains in the bulk coolant, which in BWRs is recirculated back down the downcomer annulus. This type of steam separation is feasible so long as the steam-leaving velocity, i.e. the bulk average velocity of the steam taken across the available pathway flow area, is not large, i.e. is no greater than about 1.8 foot/second. If steam-leaving velocities exceed this value, there tends to be carried along with the steam an unacceptably high moisture content. The high moisture levels saturate the moisture-drying abilities of the steam dryer, thus resulting in an unacceptably high moisture content in the steam leaving the reactor and supplied to the turbine. When steam moisture contents are too high in the turbine steam flow, accelerated erosion can occur on first-stage turbine blades and the efficiency of the turbine is reduced.

It is possible to obtain free-surface separation capabilities if the reactor pressure vessel (RPV) cross-sectional area is made sufficiently large. However, cost economies dictate that minimum diameter RPVs be used, so that mechanical steam separation has been developed to handle the high power output steam production levels of modern BWRs. In these latter designs, the steam bulk average velocity moving through the wet steam plenum region immediately downstream of the mechanical steam separators is about 5 feet/second.

The fuel assemblies grouped over the central region of the core tend to have higher exit steam qualities than do bundles located at the peripheral region of the core. It is desirable, nonetheless, that the flow rates and steam/water mixture proportions entering the steam separator standpipes be relatively uniform. To facilitate gaining more nearly uniform steam/water mixture for entry into the standpipes, the standpipe entrances are separated from the fuel assemblies by a distance of, for example, about 5 feet. Turbulent mixing occurring between the plumes leaving adjacent fuel assemblies, each with a different void content, is one mechanism acting to produce a more nearly uniform mixture which enters into the steam separator standpipes. More important to achieving flow mixture uniformity, however, is the hydrodynamic flow resistance represented by the standpipes, each with their end-mounted steam separators. Complete flow mixture uniformity entering the standpipes is at best difficult to achieve and, even with a five-foot separation between fuel assembly exits and standpipe entrances, it is not a design basis used for reactor performance evaluations.

The steam separator assembly consists of a domed or flathead base on top of which is welded an array of standpipes with a three-stage steam separator, for example, located at the top of each standpipe. One function of the standpipes is to provide a stand-off separation of the larger-diameter steam separators, which are generally arranged in a particularly tightly-compacted arrangement in which external diameters of adjacent separators are nearly touching with each other, so that separated liquid coolant discharged at the bottom of the separator has a more "open" flow path outwardly from the reactor longitudinal axis and out to the downcomer annulus region which lies at the inboard periphery to the RPV. A second purpose for the standpipes in a high-power-output natural-circulation reactor using mechanical steam separators is to provide juxtaposed regions which promote natural-circulation by means of a vertical region of two-phase (and, thus, low-density) coolant inside the standpipes which is juxtaposed against single-phase liquid coolant outside the standpipes in a so-called "downcomer region", in which region height provides a very significant part of the total natural circulation driving head for coolant flow circulation within the reactor.

The steam separator assembly rests on the top flange of the core shroud and forms the cover of the core discharge plenum ("core upper plenum") region. The seal between the separator assembly and core shroud flange is a metal-to-metal contact and does not require a gasket or other replacement sealing devices. The fixed axial flow type steam separators have no moving parts and are made of stainless steel, for example, to resist corrosion and erosion.

In each separator, the steam/water mixture rising through the standpipes (the "standpipe region") impinges upon vanes which give the mixture a spin, thus establishing a vortex wherein the centrifugal forces separate the water from the steam in each of three stages. Steam leaves the separator at the top of this assembly and passes into the wet steam plenum below the dryer. The separated water exits from the lower end of each stage of the separator and enters the pool (the "downcomer region") that surrounds the standpipes to join the downcomer flow. The steam exiting from all separators either may be in the same horizontal plane, or the separators may be arranged in a slightly crowned fashion at the center to compensate for a crowned water gradient of the pool surrounding the standpipes.

The steam separator assembly may be bolted to the core shroud flange by long hold-down bolts, or the separator together with the dryer assembly may be held down onto the core shroud flange by contact from the reactor head when the latter is assembled to the reactor vessel. The nominal volumetric envelope of the steam separator assembly is defined by the horizontal plane of its lower flange that contacts the core shroud flange, its cylindrical sides that provide part of the five-foot standoff from the fuel assembly exits, the circumscribed diameter of the outermost row of standpipes, the circumscribed diameter of the outermost row of steam separators, and the generally horizontal plane of the exits to the steam separators.

The core upper plenum region in a BWR currently under design known as the "simplified boiling water reactor" (SBWR) is substantially devoid of other mechanical devices, pipes, or structures; whereas the core upper plenum of a BWR/6 and "advanced boiling water reactor" (ABWR) reactor design generally contains spargers and nozzles for core sprays, and distribution headers for core flooders, respectively. In both reactor types, these spargers/headers are located at the outer periphery of the core upper plenum, mounted below the core shroud flange so that the sparger/header is clear of the refueling removal path of peripheral fuel assemblies and, thus, do not become removed during core refueling operations.

With specific reference to a natural-circulation SBWR, it will be observed that there are no recirculation pumps to aid in coolant recirculation. Steam generation in the core produces a mixture of steam and water which, because of steam voids, is less dense than saturated or sub-cooled water. Thus, the boiling action in the core results in buoyancy forces which induce core coolant to rise upwardly, to be continuously replaced by non-voided coolant arriving from beneath the core in the core lower plenum region. As the coolant leaves the core, it rises through the core upper plenum region, then through the standpipes region, and finally into the steam separators. This voided mixture inside these standpipes continues to be less dense than non-voided coolant external to the standpipes, resulting in the development of additional buoyancy force to further drive the coolant circulation. That this process is quite effective in promoting coolant recirculation can be noted from reported tests made in forced-circulation power reactors where the coolant circulation pumps are shut off. Even with their relatively short steam separator standpipes, reactor power levels of 25% and coolant flow rates of 35% of rated flow, are readily and safely maintainable.

The SBWR reactor is but modestly different from the forced-circulation BWR, with the most prominent differences being that the standpipes region is to be considerably longer in the SBWR (to develop a higher differential head), the core overall height may be somewhat shorter (for example, being 8 or 9 feet active fuel length versus 12.5 feet active fuel length in recent forced-circulation reactors), and the core power density will be somewhat lower. The severity of orificing—a means to promote hydrodynamic stability—at the entrance to the BWR fuel bundles may be lessened. The fuel bundle may have a larger diameter fuel rod in, for example, a 6×6 rod array, whereas the rod array for a forced-circulation reactor often is an 8×8 rod array. The design flow rates per fuel bundle, and the flow rates per steam separator, will be somewhat reduced in the SBWR design. Fuel exit steam quality will be approximately the same between the two designs. In the SBWR reactor design, no spargers or discharge headers are installed in the core upper plenum, while in the ABWR reactor, spargers or discharge headers are installed in the upper core plenum.

In some versions of SBWR reactors under study, the standpipes are very long while the core upper plenum is short. In other versions, the converse is true. The present invention is applicable equally in either version.

"Load-following" is the action of bringing the power output of a BWR into balance with an incrementally changed power output demand. This demand change arises from the electrical grid to which the nuclear power station is coupled and represents a change from prior steady-state (balanced) operating conditions.

By way of illustration, assume that an SBWR is operating at 90% of rated power output. Existing within the core will be some certain distribution of voids, i.e., steam vapor in the form of steam bubbles. The lowermost parts of the fuel assemblies will contain non-voided coolant because of the sub-cooled liquid conditions existing in the core lower plenum, the source for water entering the core. Partway up the flow path within the fuel assemblies, steam generation begins, so that a steam/liquid mixture develops with the steam proportion rising with increasing travel upward through the fuel assembly. Control blades immediately outside the fuel assembly channels will stand in various degrees of withdrawal from the core depending on the particular point the core has reached in its fuel cycle lifetime.

The steam output from the nuclear boiler is coupled to a turbine generator, which, in turn, is coupled electrically to the grid. A nuclear boiler pressure regulation control system is installed, the action of which changes the position of turbine steam control valves in such a way so as to maintain constant the nuclear boiler pressure as measured in the reactor steam dome.

A change in grid electrical demand—say an incrementally increased demand for more electrical power from the power station—causes a signal to be sent to a control rod positioning system that results in incremental withdrawal of certain of the control blades still not fully withdrawn from the core. This withdrawal has the effect of making the reactor temporarily more reactive, allowing an increase in neutron flux, that, in turn, produces a higher rate of nuclear fission throughout the fuel rods. The thermal capacitance represented by the mass of the fuel material (uranium dioxide) briefly, i.e.

for a few seconds, absorbs the thermal energy produced throughout the fuel rods as their internal temperature rises. (The fuel heat transfer thus lags the neutron flux, the transient response characteristic being that of, typically, a seven-second time constant.) Soon, however, the higher temperatures lead to greater heat transfer from the now-higher fuel clad temperature to the reactor coolant, and so an incrementally higher amount of steam is formed. In addition, the point where boiling first begins within the fuel assembly moves slightly downward in response to the higher heat transfer that is occurring. This combination of incrementally more voids in prior boiling regions, plus downward movement of the boiling boundary, now introduces negative reactivity effects that returns the reactor to a balanced, steady-state, power level, but one that is generating incrementally more steam. In response to the larger steam generation rate, to hold pressure constant in the reactor steam dome (as the control system mandates), the pressure regulation system progressively incrementally opens the turbine control valves, thus releasing a net greater quantity of steam to the turbine. Higher steam rates passing through the turbine produce the required incremental increase in ultimate response to the initiating electrical grid demand for more electrical power from the station.

The principles described above can be extended to those conversant with nuclear engineering practice to understand other types of power adjustments. It will be apparent that the foregoing illustration is the response to a small increase in load demand. Obviously, the adjustment of reactor power output also can be performed manually by the reactor operator, through his actions to cause control blades to be inserted farther into the core or withdrawn farther outward from the core.

Often, a nuclear power station is required to sustain larger load demand adjustments than the relatively small adjustment described above. Existing nuclear power stations are deficient in that it takes time to retract the control blades. Even when the control blades are moved in groups ("ganged rod movement"), it still requires time for the groups to be sequentially moved. An additional disadvantage to load-following by control blade movement can be that the heating transients within the fuel occurring close to the ends of where the control blades are positioned, over time can produce undersirable stress-cycling on fuel cladding.

An alternative load regulation means that has been found effective for forced-circulation BWRs is to use recirculation flow control. A signalled change in reactor power demand is sent to a control system that adjusts the recirculation flow upward or downward. The recirculation flow is regulated either by changing the speed of the main recirculation pumps, or in other applications by throttling the output from constant-speed pumps by means of a flow-control valve. The changed flow causes a rather prompt change in the amount of voids in the core and a similar change in the position of the boiling boundary within the fuel assemblies within the core. For example, the action response in the recirculation flow control system to an incremental demand for more reactor output would be to raise the rate of recirculation flow. This sweeps some existing voids out of the core, and raises the position of the boiling boundary. In turn, neutron flux rises, fission rate increases, and shortly a higher total amount of steam is being generated. With the reappearance of "near-normal" levels of voids in the core in response to the higher power output, the reactor condition returns to a "steady-state", but now at a higher output level. The two advantages of recirculation flow control are that the rates of change in reactor power can be faster; and since control blades are not required to be moved, no additional significant stress-cycling duty is imposed on the fuel rods.

To date, however, natural-circulation reactors have had only control rod movement available to them as a load-following means. As described earlier, a drawback with this mode of load-following control, i.e. performing load-following by moving control blades, is that it can be a slow-acting system because there are so many blades which must be moved some variable small amounts to effect a change while keeping the neutron flux profiles in desirable patterns. Thus, for various modes of power operation, it would be desirable for there to be other methods of more rapidly, yet controllably, affecting reactor power output, and thereby provide enhanced capability to perform a wider envelope of load-following maneuvers.

BROAD STATEMENT OF THE INVENTION

The present invention discloses an improved methodology for achieving the desirable feature of recirculation flow control in a free-surface separation, natural-circulation BWR, enabling reactors utilizing the method to perform in load-following modes of power operations. In its broadest aspects, the method is based on separating the steam flow from the core into two distinct flows that each pass through separate steam dryer assemblies. The second, or supplemental, steam flow path is designed to enhance liquid water separation therefrom for enhancing the quality of the steam (i.e. the weight percent steam in the mixture) that passes to the second steam dryer assembly. By modulating the amount of steam withdrawn from the reactor through the primary steam separator assembly, the pressure losses will increase in the recirculation path, thereby reducing the recirculation flow and, consequently, the power level of the reactor. A second effect of such steam modulation is to increase the fraction of steam entrained in the downcomer, which also reduces the power level, thus facilitating load-following capability of the reactor.

Accordingly, the present invention is directed to a natural-circulation boiling water reactor of the free-surface separation type wherein housed within the reactor pressure vessel (RPV) is a nuclear core which with the RPV defines an annulus region which is in flow communication with a core lower plenum region disposed beneath the nuclear core. A first upper steam dryer assembly is connected to a steam outlet in the RPV. A chimney is mounted atop the core and is in fluid communication with the first upper steam dryer assembly. The region outside of the chimney defines a downcomer region which also is in fluid communication with the chimney. Free-surface steam separation occurs within the chimney. Finally, a feedwater inlet is disposed within the RPV. The improvement for obtaining load-following capability in accordance with the present invention comprises a riser extension mounted atop the chimney and in fluid communication with the first upper steam dryer assembly. The riser extension has a plurality of orifices disposed about its outer periphery to provide fluid communication between the chimney and the downcomer region. A plurality of upstanding vanes are mounted atop the chimney and in adjacency with the riser extension orifices. The vanes define the outer periphery of the riser extension and direct fluid communication between the riser extension and the downcomer region. A second upper steam separator assembly is disposed within the RPV and is connected to a second steam outlet disposed within the RPV. The first steam outlet has a controllable, flow-restricting valve disposed therewithin. The downcomer region is in fluid communication with the second upper steam separator assembly. The foregoing arrangement permits a fraction of the steam passing through the riser extension to be guided by the vanes to pass to said downcomer region and impinge upon the RPV for separation of liquid water therefrom. The flow restricting valve controls the amount of steam that passes into the second steam separator assembly, and, thus, permits load-following capability for the BWR.

Advantages of the present invention include a new means for providing load-following capability for free-surface separation type natural-circulation BWRs. Another advantage of the present invention is the ability to improve the quality of steam passed into the second steam separator assembly. These and other advantages will be readily apparent to those skilled in the art based upon the disclosure contained herein.

BRIEF DESCRIPTION OF THE DRAWINGS

FIG. 1 is a simplified cross-sectional elevational view of a free-surface separation natural-circulation BWR showing one practical configuration for implementation of the present invention; and FIG. 2 is a view taken along line 2—2 of FIG. 1.

The drawings will be described in detail below.

DETAILED DESCRIPTION OF THE INVENTION

Since a natural-circulation BWR contains no recirculating devices nor external loops, regulating the speed of the prime drive motor so as to produce a controlled recirculation flow rate or throttling flow control valves located in external recirculation loops to obtain flow rate regulation, are unavailable. Accordingly, the problem to be solved is to devise an improved means of obtaining effective load-following capability in free-surface separation BWRs and for which the drawbacks in the form of added components are minimal and are acceptable considering the benefits obtained. The design arrived at in accordance with the present invention not only provides load-following capability, but improves the quality of a fraction of the steam fed to a second steam dryer assembly. Thus, the added components serve a dual function. With reference to the drawings, it will be appreciated that much of the reactor internals are conventional and have been omitted from the drawings, as such components are unnecessary to the modifications which need to be made to the BWRs in accordance with the precepts of the present invention. The reactor internals, their construction, and operation are well known in the art, such as illustrated by reference to the following publications: Glasstone and Sesonske, *Nuclear Reactor Engineering*, pp 748–753, 3d Edition, VanNostrand, Reinholt (New York, N.Y., 1981); Wolfe and Wilkens, "Improvements in Boiling Water Reactor Designs and Safety", presented at American Nuclear Society Topical Meeting, Seattle, Wash., May 1–5, 1988; Duncan and McCandless, "An Advanced Simplified Boiling Water Reactor", presented at the American Nuclear Society Topical Meeting, Seattle, Wash., May 1–5, 1988; and Lahey and Moody, *The Thermal Hydraulics of a Boiling Water Nuclear Reactor*, especially Chapter 2, pp 15–44, American Nuclear Society (LeGrange Park, Ill. 1977). Conventional BWRs, the ABWR, and the SBWR, all are described and discussed in the foregoing references, all of which are expressly incorporated herein by reference. Additionally, reference is made to Lutzow, et al., "Experimental Studies on the Entrainment of Bubbles into the Settling Shaft of a Convection Type Nuclear Reactor", *Kernenergie*, 30 (1987) 3, pp 114–117, which discusses entrainment of bubbles in a reactor design that includes forcing the steam from the chimney into the downcomer region for heat exchange purposes. Finally, the use of a radial vane separator is discussed in "Method of Reducing Carry-over and Reducing Pressure Drop Through Steam Separators", NP-1607, pp. B28–B35, Electric Power Research Institute, Palo Alto, Calif. (Nov. 1980). The disclosure of all citations herein is expressly incorporated by reference.

Referring to FIG. 1 more particularly, reactor pressure vessel (RPV) 10 is seen to admit feedwater via inlet 12 and exhaust steam via outlets 14 and 16. As generally described above and in particular in the references cited, with respect to the flow path of water within RPV 10, sub-cooled water located in annular downcomer region 18 flows downwardly between RPV 10 and core 20 which forms annulus region 22 therebetween. The water flowing through annulus region 22 then flows to core lower plenum region 24. Again, for simplicity many of the reactor internal components have not been illustrated in FIG. 1, as these items are conventional as will be readily apparent to those versed in the art. The water then enters the fuel assemblies disposed within core 20 wherein a boiling boundary layer is established, thus causing a lower non-boiling region and an upper boiling region within the fuel assemblies. In conventional fashion, flow by-passing is to be provided as is necessary, desirable, or convenient in conventional fashion.

Next, a mixture of water and steam enters chimney 26 which is mounted atop core 20. In a conventional natural circulation free-surface separation BWR, steam within chimney 26 passes upwardly to an upper steam dryer assembly and the dried steam then is withdrawn from the RPV.

In accordance with the present invention, however, riser extension 28 is mounted atop chimney 26 by mounting annular plate or lip 30. With reference to FIG. 2, it will be seen that a series of apertures 32 are disposed in riser extension 28. In adjacency with apertures 32 are a plurality of up-standing vanes 34. Vanes 34 form the outer periphery of riser extension 28. It will be observed that downcomer region 18 is formed between RPV 10 and the outer periphery of riser extension 28 and chimney 26.

It will be observed from the orientation and configuration of vanes 34, that a slight rotation to the flow of steam passing through apertures 32 results. For the fraction of steam influenced by centrifugal vanes 34, a rotary motion (centrifugal force) is imparted to the two-phase steam mixture whereby the liquid phase of the steam mixture is thrown radially outward toward the inner surface of RPV 10 and, thus, separates from the steam mixture. The vaporous phase of the steam mixture will remain next to riser extension 28 and flow upwardly into second steam dryer assembly 36 and thence will be withdrawn from RPV 10 via steam outlet 14. Thus, vanes 34 function to improve the quality of that fraction of steam that is influenced by these vanes.

Alternatively, it may be appropriate to form riser extension 28 solely from upstanding vanes 34 with the spacing therebetween taking the place of orifices 32 otherwise formed within tubular member 31 forming riser extension 28. Pressure drops and flow rates necessarily will impact on whether orifices 32, and their sizes, need to be provided; or whether the offset between upstanding vanes 34 will suffice. Those skilled in the art will readily be able to determine the precise design configuration appropriate for their use.

A large fraction of the steam, however, is separated inside riser extension 28 and will flow upward into first steam dryer assembly 38 for withdrawal from RPV 10 via steam outlet 16. Within steam outlet 16, close in proximity to RPV 10 or remotely located therefrom, is flow restricting valve 40. By throttling the amount of steam permitted to be withdrawn from RPV 10 via outlet 16, the operator can force more steam to be acted upon by vanes 34 for further improving the quality of extra steam passing into downcomer region 18 and into steam dryer assembly 36. Operation of valve 40 has two effects: the pressure losses will increase in the recirculation path, thereby reducing the recirculation flow and consequently the power level of the reactor; and an increase in the fraction of steam entrained in the downcomer will also reduce the power level, thus facilitating load-following operation. Moreover, as the efficiency of rotary motion or centrifugal force is applied to that fraction of the steam passing through vanes 34, so too will the quality of the steam passed to steam dryer assembly 36. Thus, the added components of the present invention serve a dual purpose for improving the efficiency and economy of the BWR constructed and operated in accordance with the precepts of the present invention.

As to the materials of construction, preferably all components are manufactured from materials appropriate for their use within a nuclear BWR. Further, it will be appreciated that various of the components shown described herein may be altered or varied in accordance with conventional wisdom in the field and certainly are included within the present invention, provided that such variations do not materially vary within the spirit and precepts of the present invention as disclosed herein.

I claim:

1. In a natural-circulation boiling water reactor (BWR) of the free-surface separation type wherein housed within a reactor pressure vessel (RPV) is a nuclear core which with the RPV defines an annulus region which is in flow communication with a core lower plenum region disposed beneath said nuclear core, a first upper steam dryer assembly connected to a steam outlet in said RPV, a chimney mounted atop said core and in fluid communication with said first upper steam dryer assembly, the region outside of said chimney defining a downcomer region which also is in fluid communication with said chimney, free-surface steam separation occurring within said chimney, and a feedwater inlet disposed in said RPV, the improvement for obtaining load-following capability, which comprises:

a riser extension comprising a plurality of upstanding vanes mounted atop said chimney and directing fluid communication between said riser extension and said downcomer region;

a second upper steam dryer assembly disposed within said RPV and connected to a second steam outlet disposed in said RPV, said first steam outlet having a controllable flow-restricting valve disposed therewithin, said downcomer region in fluid communication with said second upper steam dryer assembly, whereby a fraction of the steam passing through said riser extension will be guided by said vanes to pass into said downcomer region and impinge upon the RPV for separation of liquid water therefrom, and said flow-restricting valve controlling the amount of steam that passes into said second steam dryer assembly.

2. The boiling water reactor of claim 1 wherein said riser extension comprises a tube mounted atop said chimney having a plurality of orifices disposed therein to provide fluid communication between said chimney and said downcomer region; and said plurality of upstanding vanes being in adjacency with said orifices and defining the outer periphery of said riser extension.

* * * * *